United States Patent

Bodenmueller et al.

[11] Patent Number: 5,805,101
[45] Date of Patent: Sep. 8, 1998

[54] PROCESS FOR DETERMINING THE POSITION OF A RADAR TARGET

[75] Inventors: Edeltraud Bodenmueller, Beimerstetten; Siegfried Vogel, Senden, both of Germany

[73] Assignee: Daimler-Benz Aerospace AG, Munich, Germany

[21] Appl. No.: 776,048

[22] PCT Filed: Aug. 3, 1995

[86] PCT No.: PCT/EP95/03092

§ 371 Date: Jan. 17, 1997

§ 102(e) Date: Jan. 17, 1997

[87] PCT Pub. No.: WO96/06366

PCT Pub. Date: Feb. 29, 1996

[30] Foreign Application Priority Data

Aug. 18, 1994 [DE] Germany .......................... 44 29 200.7

[51] Int. Cl.⁶ .................................................. G01S 13/66
[52] U.S. Cl. ................................. 342/41; 342/21; 342/23
[58] Field of Search .................................. 342/21, 41, 23

[56] References Cited

U.S. PATENT DOCUMENTS 3,803,602  4/1974  Case et al. ............................. 342/105
3,803,604  4/1974  Case ........................................ 342/30
3,996,590  12/1976 Hammack ............................... 342/465
4,208,657  6/1980  Bryden et al. .......................... 342/182
5,300,933  4/1994  Discenza et al. ....................... 342/36
5,313,201  5/1994  Ryan ....................................... 340/961

OTHER PUBLICATIONS

R. Klepko: "Automatic ship image extraction from synthetic aperture radar imagery". In: IGARSS '90 Conference Proceedings, vol. 1, May 20, 1990, Maryland, pp. 691–694.

J. Maaloe: "Classification of Ships using an Incoherent marine radar". In: Radar–82 International Conference, Oct. 18, 1982, London, UK, pp. 274–277.

Primary Examiner—John B. Sotomayor
Attorney, Agent, or Firm—Spencer & Frank

[57] ABSTRACT

A process is disclosed for determining the position and/or the displacement in time (trace) of a (radar) target surface by a radar installation. A predeterminable number M of the largest echo amplitudes is first determined for the target surface, as well as the corresponding resolution cells (distance and azimuth coordinates). By averaging the distance and azimuth coordinates of the selected resolution cells, coordinates are determined for a reference point that is stable in space in relation to the target surface. This reference point is used for locating and/or tracing objects in particular ships.

7 Claims, 2 Drawing Sheets

PROCESS FOR DETERMINING THE POSITION OF A RADAR TARGET

BACKGROUND OF THE INVENTION

The invention relates to a process for determining the position of a radar target extending over several resolution cells. More particularly, the invention relates to a position-determining process of the type wherein echo signals reflected from resolution cells are mixed in the baseband so that an amplitude-modulated signal of the radar target is generated; in the baseband, at least for all resolution cells to be associated with a radar target the amplitude values are determined; and the position of the radar target is determined from the size of the amplitude values and/or their distribution in the area defined by the resolution cell.

The term "resolution cell" used in the present patent application is intended to cover the terms "radar resolution cell" as well as "area resolution cell". A radar resolution cell identifies the spatial resolution of a radar installation. A radar resolution cell is a design-dependent constant of the radar installation. In an area resolution cell, several radar resolution cells are combined as needed. Therefore, an area resolution cell is considerably larger in its spatial extension than a radar resolution cell.

The invention relates in particular to the determination of the position of a large-surface radar target such as, for example, an oceangoing freight ship or passenger ship. Such radar targets comprise several resolution cells, for example, a few hundred, when such a radar target moves past a radar set at a relatively small distance and/or when the radar set has a high spatial resolution. This condition exists, for example, in the (radar) monitoring of harbor access routes and/or shipping routes. There, it is necessary, for example, to determine and to track the position of one or several ships as accurately as possible with a stationary radar set, which ships generally have little maneuverability because of their size, so that, for example, compliance with a predetermined route can be checked and/or advance warning of a possible collision can be given.

Such target surfaces, for example, a ship having a length of approximately 200 m, due to their design, e.g., the superstructures and/or the freight, may have a plurality of radar reflectors. A moving ship also generates bow waves as well as stern waves (stern sea) which also reflect radar waves and thus change the extension of the actual radar target, the ship. A particularly disturbing effect on the determination of the target position results from reflections which are generated on the ship itself and which melt into the useful echoes. Furthermore, a radar installation may also create apparent radar targets, for example, due to the so-called minor lobes of the radar antenna, which apparent radar targets can also move along with the actual radar target, the ship.

If, for such a (radar) situation, the position of a (radar) target surface, for example, the ship, is now intended to be determined accurately solely on the basis of the radar information, for example, by way of the spatial resolution capacity possible per se of the radar installation of, for example, one tenth of the length of the ship, it is first necessary to find a characteristic (radar) reference point for the desired radar target, the ship, and to then track the position of the reference point continuously in time.

In this context, one might consider selecting for this (radar) reference point the reflector with the largest (radar) echo amplitude. But this method fails in a disadvantageous manner if several equivalent reflectors and/or apparent reflectors are arranged so as to be closely adjacent to one another.

For a large-surface radar target, which is comprised of several actual and/or apparent individual targets, one might consider selecting and tracking a surface center point or surface center of gravity of the radar target as a characteristic reference point by way of an averaging and/or integration method. A reference point determined in this manner can also greatly change its position in a disadvantageous manner and thus simulate a change of position of the actual target, for example, of the ship. Such a case arises, for example, when the stern sea of a ship changes considerably, e.g., as a result of a speed change of the ship. In such a case, there is a great change of the radar reflection to be associated with the stern sea, which radar reflection changes the (radar) position of the (radar) surface target in a disturbing manner because of the above-mentioned averaging and/or integral formation. Similar problems arise as a result of aspect-dependent reflections on the ship itself.

SUMMARY OF THE INVENTION

It is the object of the invention to propose a position-determining process of the generic type mentioned at the onset by means of which a reliable determination of a reference point to be associated with the radar target becomes possible for a large-surface radar target.

This object is accomplished by a position-determining process which is characterized in that in a predeterminable region of each associated resolution cell from which at least one echo signal is received an amplitude value is determined which corresponds to the echo signal, from the amplitude values of a resolution cell a maximum amplitude value is determined which is associated with the resolution cell, from the maximum amplitude values of all resolution cells the M largest amplitude values are selected, with M being a predeterminable, integer, positive number, the coordinates (E, AZ) of the associated resolution cells are determined for the M largest amplitude values, the associated mean values (E(F), AS(F)) are formed from the coordinates (E, AZ), and the mean values (E(F), AZ(F)) form the coordinates of a reference point which determines the position of the radar target.

A first advantage of the invention is that the determined (radar) reference point is stable relative to the (radar) shape of the (radar) target surface. The latter can therefore move without any disturbing jumps of the reference point, i.e., simulating fast apparent spatial changes. Thus, it is assured that a reliable trace tracking of a target becomes possible.

A second advantage is that, for the above-mentioned larger ships, the reference point essentially corresponds to the actual center of the ship so that the determination of the position by way of the reference point corresponds in a reliable manner to the actual position which is always indicated for the center of the ship.

Further advantages result from the description which follows.

DESCRIPTION OF THE PREFERRED EMBODIMENTS

Figure 1:
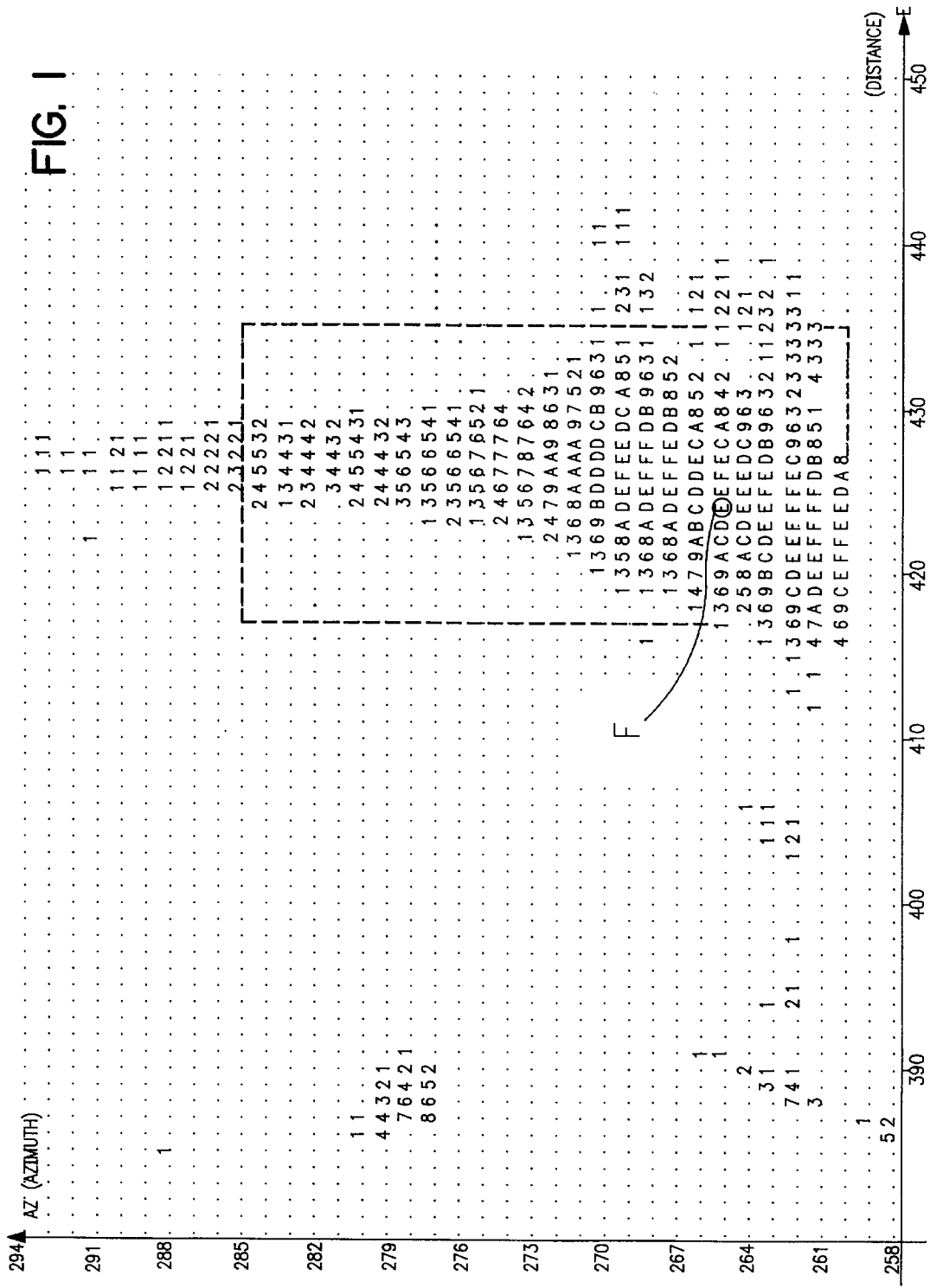
FIG. 1 is a graph showing an example of radar echo signals.

The invention is based on the evaluation of demodulated radar echo signals in the baseband, e.g., the video band.

There, the echo signals associated with a radar target as well as with a resolution cell are represented as amplitude-modulated signals, i.e., a large amplitude value is allocated to a good (radar) reflector. It is advisable to select the size of the resolution cells to be considerably smaller, e.g., ten times smaller, than the size of the radar target to be expected, e.g. of a ship. This accomplishes a good (radar) representation of the radar target.

If a predeterminable area, which is composed of a plurality of resolution cells, includes a large-surface radar target, e.g., a ship, a reference point defining the large-surface radar target is advantageously determined by means of the SGS method (SGS is the German acronym for Schwerpunkt-Varfahren mit Hilfe einer Geordneten Statistik: center of gravity method with the assistance of an ordered statistics). For a ship, this reference point advantageously corresponds to the center of the ship. In the SGS method, those resolution cells having the M largest amplitudes are first selected from the area, with M being a predeterminable, integer, positive number. This selection of the M largest amplitudes is possible in different ways. For example, the amplitudes can be selected from the entire area or only from a spatially limited partial area which, for example, has a strip-shaped form. The latter may comprise, for example, the radar representation of a ship including all reflections as well as the associated bow waves and stern waves. In the selection of these M largest amplitudes, the allocation to the respective resolution cell is maintained in each case.

The determination of the largest amplitudes preferably takes place in that the distance range and the azimuth range of the radar monitoring area are quantized for digital data processing. Each echo is completely characterized by amplitude, distance and azimuth. In each distance quantum, there exists a moving window detector for the target recognition criterion and a maximum window arranged azimuthally for determining the amplitude maximum in this distance quantum. If several amplitudes in a distance quantum are at the same level, a definite maximum amplitude does not exist. Then, the mean position of all identical amplitudes is relevant. The maximum amplitude is allocated to this mean position. For all maximum amplitudes determined in this manner, the mean positions are formed and from these an amplitude ranking, which is stored in a list, is formed by means of the ordered statistics. Subsequently, the largest amplitude appearing in the list is selected.

On the basis of this (in absolute terms) largest amplitude value, the next-smaller maximum amplitudes are selected, namely M-1piece. These were also determined by way of the ordered statistics method.

This determination of the M largest amplitudes as well as of the associated resolution cells of a target surface is carried out with each rotation of the radar antenna or a comparable pivot process of the antenna lobe.

If the antenna lobe leaves the target surface F during the pivot process, a reference point having the distance coordinate E(F) as well as the azimuth coordinate AZ(F) is formed for the target surface according to the formulas E(F)=S(E)/M and AZ(F)=S(AZ)/M.

Here,
S(E) is the sum of all distances, measured from the ship or other radar antenna, of the resolution cells which are associated with the M selected amplitudes;
=S(AZ) is the sum of all azimuth values which are associated with the M selected resolution cells; and
=M is the number of the resolution cells=number of the selected amplitude values.

A reference point determined in this manner is stable in an advantageous manner, i.e., is associated with the (radar) shape (shape of a target surface on a radar screen) of a target surface and thus largely independent of the time (number of pivot processes of the antenna lobe). Such a reference point can therefore be used reliably for determining the position as well as for the tracking of a target surface. It is particularly advantageous that, for a larger ship, a reference point which was determined in this manner corresponds to the center of the ship. Therewith reliable tracking becomes possible.

FIG. 1 shows a two-dimensional representation (distance E and azimuth AZ) of an example of a baseband video signal, digitized in the hexadecimal code (zero to F), for an ocean region. The distance (or range) E is plotted in arbitrary distance units and the azimuth AZ is plotted in degrees. The corners of zeroamplitude resolution cells are marked by four adjacent grid points, and hexadecimal amplitude values are shown in resolution cells where the video signal has an amplitude greater than zero (that is, 1 to F). In the example of FIG. 1, each radar echo is completely characterized by a hexadecimal amplitude value, a distance value, and an azimuth value.

FIG. 1 shows that a large surface target (a ship F) must be present between the distance values 410 and 440. With the present invention, the M highest amplitude values are selected. This can advantageously be done with ordered statistics. The highest amplitude values are all located within a frame shown by a dashed line, which can be selected from the beginning. The position of the center of the ship F is determined with the above formulas. The thus-obtained position of the center of ship F is marked in FIG. 1.

Figure 2:
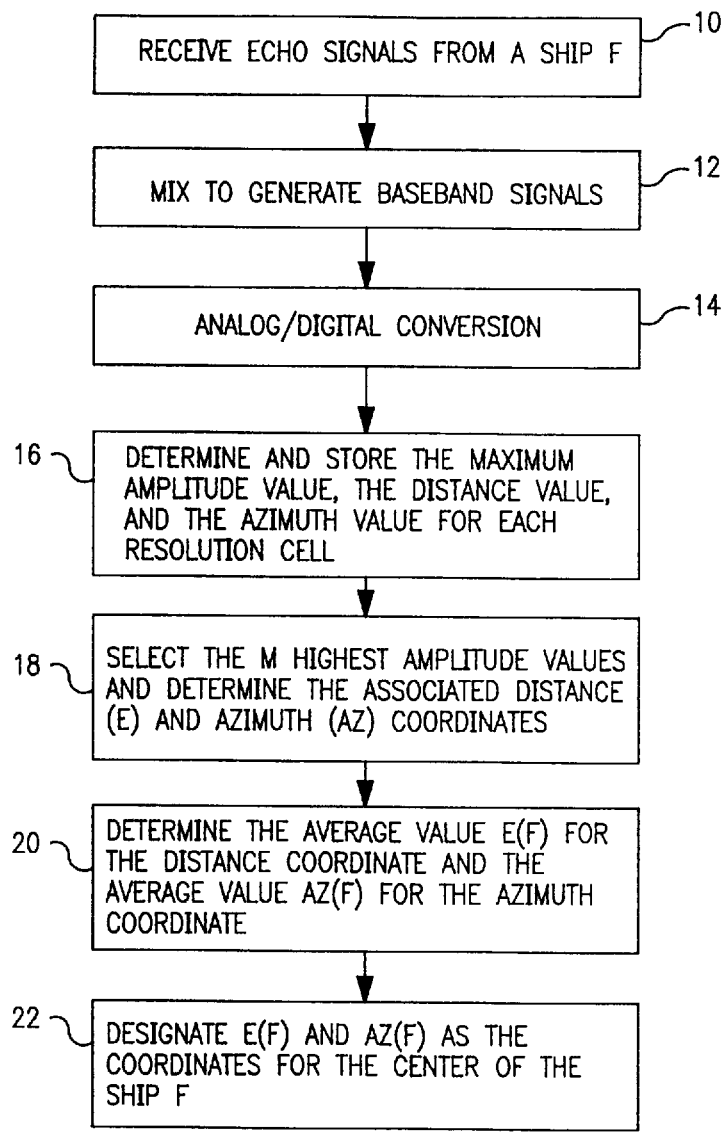
FIG. 2 is a process flow chart for implementing the present invention.

In FIG. 2, radar echo signals from the ship F are received in step 10 and the baseband video signal is generated in step 12. This is converted to digital in step 14. For each resolution cell, the maximum amplitude value, the distance value, and the azimuth value are then determined in step 16. Then the M highest amplitude values are selected in step 18 and their associated distance and azimuth coordinates E and AZ are determined. The average distance and azimuth values are found from the selected values in step 20 and used to designate the center of the ship F in step 22.

The process described is not limited to the application of monitoring ship traffic but can be applied in many different ways to further (radar) targets. For example, the size of a resolution cell can be selected according to the size of the target surface and/or the accuracy of the location of the reference point to be determined. It is advisable, for example, to select the number M as a variable that can be set at a valve which is determined empirically. In high-resolution radar installations, M is selected to be larger than in low-resolution radar installations. Furthermore, M is a function of the absolute level of the amplitude (values) of the echo signals. For example, for a target surface to which small amplitudes are allocated, the number M should be smaller than for a target surface of identical size which, however, generates larger echo amplitudes, i.e., represents a better radar reflector.

The invention is therefore not limited to the examples described but it can be applied analogously to all (radar) target surfaces wherein a reference point is necessary for determining the position and/or the movement (trace).

What we claim is:

1. A process for determining the position of a radar target extending over several resolution cells, comprising the steps of:

(a) mixing echo signals reflected from resolution cells in the baseband so that an amplitude-modulated signal of the radar target is generated;

(b) in the baseband, determining amplitude values for at least all associated resolution cells that are associated with the radar target; and (c) determining the position of the radar target, step (c) including (c-1) in a predeterminable region of each associated resolution cell from which at least one echo signal is received, determining amplitude values which correspond to the echo signal, (c-2) from the amplitude values of each associated resolution cell, determining a maximum amplitude value for the respective associated resolution cell, (c-3) selecting the M largest amplitude values from the maximum amplitude values of all associated resolution cells, with M being a predeterminable, integer, positive number, (c-4) determining distance and azimuth coordinates of the M associated resolution cells having the M largest amplitude values, and (c-5) finding mean distance and azimuth values from the distance and azimuth coordinates, the mean values providing coordinates of a reference point which indicates the position of the radar target.

2. A method according to claim 1, wherein at least the M largest amplitude values are determined by an ordered statistics method.

3. A method according to claim 1, wherein the maximum amplitude value of each associated resolution cell is determined by an integration method wherein all amplitudes of the respective resolution cell are added.

4. A method according to claim 1, wherein each resolution cell has a size, and wherein the number M is selected as a function of at least one of the size of the resolution cells and the size of the maximum amplitude values.

5. A method according to claim 1, wherein each resolution cell has a size and the target has a size, and wherein the size of the resolution cells is selected to be considerably smaller than that of the radar target.

6. A method according to claim 1, wherein the radar target is a ship and the reference point is set to be the center of the ship.

7. A position-determining process, comprising the steps of:

(a) receiving echo signals reflected by a radar target which extends over a plurality of resolution cells;

(b) determining a subset of the resolution cells from which the reflected echo signals are stronger;

(c) finding an azimuth coordinate and a distance coordinate for each of the resolution cells in the subset; and (d) finding a mean azimuth value from the azimuth coordinates and a mean distance value from the distance coordinates, the mean azimuth and distance values serving as coordinates of a reference point which indicates the position of the radar target.

* * * * *